(12) United States Patent
Martinez et al.

(10) Patent No.: US 8,535,430 B2
(45) Date of Patent: *Sep. 17, 2013

(54) HYDRAZINE FILTRATION METHOD AND SYSTEM

(75) Inventors: Rodolfo A. Martinez, Santa Fe, NM (US); Merritt C. Helvenston, Las Vegas, NM (US); Jose C De Baca, Las Vegas, NM (US); John R. Juarez, Albuquerque, NM (US)

(73) Assignee: New Mexico Highlands University, Las Vegas, NM (US)

( * ) Notice: Subject to any disclaimer, the term of this patent is extended or adjusted under 35 U.S.C. 154(b) by 224 days.

This patent is subject to a terminal disclaimer.

(21) Appl. No.: 13/082,126

(22) Filed: Apr. 7, 2011

(65) Prior Publication Data

US 2011/0182780 A1 Jul. 28, 2011

Related U.S. Application Data

(63) Continuation-in-part of application No. 12/504,917, filed on Jul. 17, 2009, now Pat. No. 8,097,074, and a continuation-in-part of application No. 12/838,632, filed on Jul. 19, 2010.

(51) Int. Cl.
*C07C 243/10* (2006.01)
*B01D 53/14* (2006.01)

(52) U.S. Cl.
USPC .............................. 96/296; 423/235; 422/122

(58) Field of Classification Search
USPC ............... 95/90, 128, 232; 96/108, 243, 296; 423/235, 236, 239.1; 588/300, 313, 315, 588/400, 403, 410; 422/120, 122, 129
See application file for complete search history.

(56) References Cited

U.S. PATENT DOCUMENTS

| 4,804,527 | A | 2/1989 | Tatarchuk et al. |
| 7,074,959 | B2 | 7/2006 | Helvenston et al. |
| 7,345,015 | B1 | 3/2008 | Kong et al. |
| 2004/0024251 | A1 | 2/2004 | Helvenston et al. |
| 2005/0121054 | A1 | 6/2005 | Barnabas et al. |
| 2007/0280865 | A1 | 12/2007 | Tonev et al. |
| 2008/0159949 | A1 | 7/2008 | Mohajeri et al. |
| 2009/0101589 | A1 | 4/2009 | Lee |
| 2009/0191110 | A1 | 7/2009 | Davis et al. |
| 2010/0291213 | A1 | 11/2010 | Berrigan et al. |
| 2011/0008693 | A1 | 1/2011 | Yang et al. |
| 2011/0011803 | A1 | 1/2011 | Koros |

OTHER PUBLICATIONS

Extance, A., "Hydrazine fuels hydrogen power hopes," *Chemistry World* Mar. 17, 2011, 2 pages.

*Primary Examiner* — Frank Lawrence, Jr.
(74) *Attorney, Agent, or Firm* — Kermit D. Lopez; Luis M. Ortiz; Melissa Silverstein

(57) ABSTRACT

A filtration system and method for the remediation of hydrazine from contaminated gas is disclosed. The system is provided in the form of a container with an net port and an outlet port containing absorbent pads or filters or wipes saturated with a solution of a dicarbonyl compound. As contaminated gas passes through the container, hydrazine present within the gas reacts with the dicarbonyl compound and becomes neutralized, thereby resulting in the exit of pure gas that no longer contains hydrazine from the container. The system can remediate hydrazine from ammonia borane to efficiently regenerate spent said ammonia borane from polyborazylene as a hydrogen storage material. The absorbent pads can also be used independently to remove hydrazine liquid spill.

19 Claims, 8 Drawing Sheets

HYDRAZINE FILTRATION METHOD AND SYSTEM

CROSS-REFERENCE TO RELATED APPLICATION

This patent application is a continuation-in-part of U.S. patent application Ser. No. 12/504,917, now U.S. Pat. No. 8,097,074, entitled "Air Filtration and Absorption Method and System for the Remediation of Hydrazine," which was filed on Jul. 17, 2009, the disclosure of which is incorporated herein by reference in its entirety. This patent is also a continuation-in-part of U.S. patent application Ser. No. 12/838,632, entitled "Hydrazine Decontamination Wipes," which was filed on Jul. 19, 2010, the disclosure of which is incorporated herein by reference in its entirety.

TECHNICAL FIELD

The disclosed embodiments relate to the remediation of hydrazine, 1,1-dimethylhydrazine, and/or monomethyl-hydrazine from a hydrazine-contaminated gas. The disclosed embodiments further relate to active chemicals (i.e. dicarbonyl compounds), and absorbent materials for the removal of hydrazine, 1,1-dimethylhydrazine, and/or monomethyl-hydrazine from a hydrazine-contaminated gas. The disclosed embodiments also relate to absorbent materials that can act as support matrices for active chemicals, whether the active chemicals are in solutions, dry powders or granules, or coatings on the absorbent materials. As utilized herein, the term "hydrazine" can refer to all hydrazines listed above (i.e., hydrazine, 1,1-dimethylhydrazine, monomethyl-hydrazine, and/or other hydrazine derivatives in which one nitrogen is an $NH_2$ group).

BACKGROUND OF THE INVENTION

Numerous industries utilize hydrazine on a daily basis. Highly toxic hydrazine fuels, for example, are respectively utilized by the United States Air Force and NASA as an emergency power source on the F-16 and as rocket propellant. The civilian industry also requires hydrazine in the manufacture of agricultural chemicals and pharmaceuticals, in photography, and also, for example, as an oxygen scavenger to prevent corrosion in boilers. Additionally, large volumes of such chemicals are shipped across the highways and rail systems annually, increasing the probability of an accidental spill.

An inadvertent release of hydrazine to the environment can be extremely hazardous due to the mutagenic nature of such chemicals, which can induce tumor growth in human beings years following even a low-level exposure. Hydrazine compounds are classified as suspected human carcinogens and the permissible levels of exposure have been reduced to 10 parts per billion (ppb) over an eight-hour workday. A hydrazine spill remediation process, to be developed, should not only remediate the hydrazine, but also should not generate other hazardous materials. An in-situ processing method involving direct application of the treatment reagent or process to the spill is preferred.

An accident involving a transport trailer, for example, may spill four to five thousand gallons of hydrazine, whereas a catastrophic failure of a fuel storage vessel at a launch facility may release twenty thousand gallons or more of the propellant. For example, a rail car derailment resulting in a release of hydrazine occurred in Southern Calif. on Jul. 28, 1991.

Hydrazine and hydrazine derivatives are readily combustible reducing agents that react violently with oxidizing agents and thus present a serious safety hazard. Hydrazine and hydrazine derivatives are well known components of liquid rocket fuels in conjunction with an oxidizing agent such as dinitrogen tetroxide. Thus, at facilities where liquid-fueled rockets are prepared for flight, there is a particular need to provide reliable and sensitive methods and systems for decontaminating objects such as fighter jets and maintenance equipment thereof, and exposed environments which can become contaminated with hydrazine. Ideally, such hydrazine remediation methods and systems should also have a limited, if negligible, effect on the environment.

Examples of hydrazine neutralization techniques are known. One example of such a technique is disclosed in U.S. Pat. No. 4,804,527, entitled "Method and Composition for Safely Decomposing Hydrazine," which issued to Tatarchuk, at al. on Feb. 14, 1989. As described in U.S. Pat. No. 4,804,527, hydrazine can be safely rendered harmless by contacting it with a composition comprising cupric oxide on a porous support. Neutralization can be achieved by drawing the hydrazine into the pellet pores where a reduction reaction of cupric oxide takes place. The critical consideration is to avoid flashing or spontaneous thermal decomposition of the hydrazine, Heat of reaction is quenched by the heat capacity of the pellet and water dilution.

The conversion of hydrazine group compounds to stable organic compounds as a result of a reaction with a dicarbonyl-compound like ketoglutaric acid is described in the U.S. Patent Application Publication No. 2004/0024251 by Helvenston, et al. entitled "Methods and Systems for Hydrazine Remediation". In U.S. Patent Application Publication No. 2004/0024251, which is incorporated herein by reference, the conversion assists in the remediation of the hydrazine group compound from the object. The stable organic compound produced as a result of the reaction between the dicarbonyl-compound and hydrazine group compound can then be treated with a metal catalyst and hydrogen to produce glutamine or a derivative thereof. The compound then becomes yet another non-hazardous material. Such an approach is also described in U.S. Pat. No. 7,074,959, which issued to Helvenston, et al. on Jul. 11, 2006 and which is also incorporated herein by reference in its entirety.

The present invention is a novel application of the reaction between hydrazine and a dicarbonyl compound for remediating hydrazine from a hydrazine-contaminated gas.

BRIEF SUMMARY

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for a system and method for remediating hydrazine, 1,1-dimethylhydrazine, and/or monomethyl-hydrazine from a hydrazine-contaminated gas.

It is, therefore, another aspect of the present invention to provide for a system and method to remediate spills of hydrazine, 1,1-dimethylhydrazine, and/or monomethyl-hydrazine.

The aforementioned aspects of the invention and other objectives and advantages can now be achieved as described herein. In one embodiment, a method and system are disclosed for remediating hydrazine from a hydrazine-contaminated gas as illustrated in the form of a container into which the contaminated gas flows and encounters with an absorbent material (e.g., filters/pads/wipes) treated with a dicarbonyl compound. Note that as utilized herein, the term "hydrazine" can refer simply to hydrazine and/or, 1,1-dimethylhydrazine, and/or monomethyl-hydrazine. The contaminated gas can be drawn into the container by a fan, vacuum, or suction. The fan may be located on the "clean" side of the container or at other appropriate locations about the container (e.g., left side, right side, top, bottom, etc.). Gas exiting the container is free of hydrazine. The container includes an inflow port and an outflow port coupled to the fan. The pads or wipes, for example, can also be used independently of the container as an absorbent for remediating hydrazine spills. An absorbent material permits said gas contaminated with hydrazine to pass through said at least one absorbent material comprising at least one absorbent material selected form the following groups of materials: a pad, a fibrous material, and a granular material. The container comprises container walls comprising at least one material selected from the following groups of materials: a natural material, metal, glass, a synthetic material, and a heat resistant material. In its operational form, the dicarbonyl compound may be present on or in the absorbent material in a dry or aqueous form.

The dicarbonyl compound comprises at least one of the following compounds: ketoglutaric add, a beta-dicarbonyl compound, a gamma-dicarbonyl compound, a remote dicarbonyl compound, a compound selected from a carbonyl-like functional group, a compound selected from a carbonyl-like functional group comprising of acetoacetonitrile, a dry powder, and a spray. The remote dicarbonyl compound comprises at least one of the following compounds: acetoacetone, propanedial, ethyl acetoacetate, levulinic acid, ethyl levulinate, and 1,3-diphenylpropane-1,3-dione.

The disclosed embodiments can also include a drip mechanism connected to said container, said drip mechanism configured to deliver liquid to said at least one absorbent material within said container to control heat produced during a chemical reaction within said container. A removable lid can be coupled to said container and said drip mechanism. A fan can be located approximate to said inlet of said container, wherein said fan draws said gas contaminated with hydrazine into said container through said inlet. A fan can also be located approximate to said outlet, wherein said fan draws said decontaminated gas out of said container through said outlet. A suction mechanism can be located approximate to said inlet of said container, wherein said suction mechanism draws said gas contaminated with hydrazine into said container through said inlet, and approximate to said outlet of said container, wherein said suction mechanism draws said decontaminated gas out of said container through said outlet.

A system for the remediation of hydrazine from ammonia borane to efficiently regenerate spent said ammonia borane as a hydrogen storage material is further disclosed. The system comprises a container with an inlet through which gas contaminated with hydrazine enters a first chamber of said container, wherein said first chamber contains regenerated ammonia borane, wherein said ammonia borane releases hydrogen forming polyborazylene, wherein said ammonia borane regenerates as said contaminated gas circulates through said container as said hydrogen storage material when said polyborazylene reacts with said hydrazine and ammonia, wherein said contaminated gas flows in a gas flow path through a second chamber of said container, wherein said second chamber contains a dicarbonyl compound, wherein said dicarbonyl compounds removes hydrazine from said contaminated gas flow. The system also comprises an outlet through which decontaminated gas passes out of said container. A first suction mechanism is located approximate to said outlet of said container, wherein said suction mechanism draws said decontaminated gas out of said container through said outlet. A second suction mechanism is located approximate to said inlet of said container, wherein said suction mechanism draws said gas contaminated with hydrazine into said container through said inlet, wherein said gas contaminated with hydrazine reacts with said dicarbonyl compound to neutralize and convert said gas contaminated with hydrazine into decontaminated gas comprising a stable organic compound that exits said container through said outlet and wherein said at least one absorbent material permits said gas contaminated with hydrazine to pass through said at least one absorbent material.

Said dicarbonyl compound can comprise at least one of the following: ketoglutaric acid, a beta-dicarbonyl compound, a gamma-dicarbonyl compound, a remote dicarbonyl compound, a compound selected from a carbonyl-like functional group, a compound selected from a carbonyl-like functional group comprising of acetoacetonitrile, a dry powder, a granular absorbent or support material coated with a dry dicarbonyl compound, suspended dry dicarbonyl compounds, a liquid solution supported by an absorbent material, a neat liquid, a spray of said neat liquid, and a solution of said neat liquid passing over a support material, such as a ceramic saddles.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
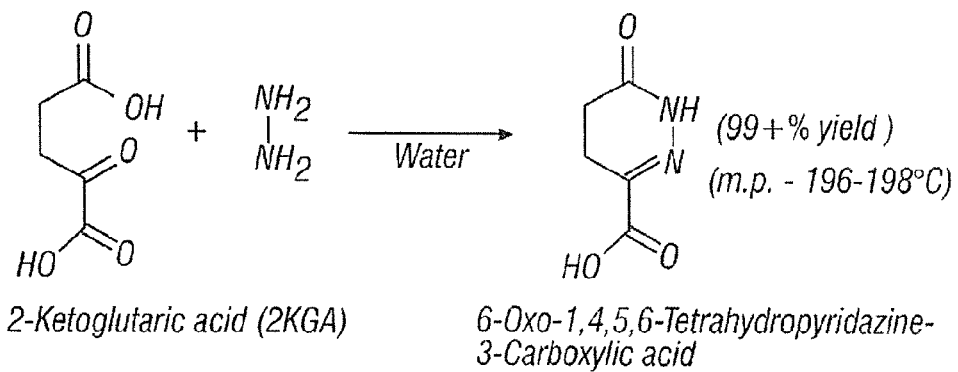
FIG. 1 illustrates a scheme indicative of the reaction of hydrazine (Hz) with 2-ketoglutaric add (2KG)

The particular values and configurations discussed in these non-limiting examples can be varied and are cited merely to illustrate at least one embodiment of the present invention and are not intended to limit the scope of the invention.

The disclosed embodiments stem from the examination of several classes of compounds that quantitatively react with hydrazine to form stable organic products. The reaction of 2-ketoglutaric acid with hydrazine reacts to provide a greater than 99% yield of 6-oxo-1,4,5,6-tetrahydro-pyridazine-3-carboxylic acid (PCA) based on hydrazine as the limiting reagent. It has been found that this compound allows for the facile remediation of hydrazine under a variety of conditions. The focus of the disclosed embodiments concerns the use of 2-ketoglutaric acid or other dicarbonyl compounds for the remediation of hydrazine.

Several classes of organic compounds have been examined by the present inventors. Such compounds react rapidly and quantitatively with hydrazine to form stable organic products. The solid-state reaction (on a milligram scale) of a hydrazine complex with 2-ketoglutaric acid (2KG) has been demonstrated. Such a reaction can produce 6-oxo-1,4,5,6-tetrahydro-pyridazine-3-carbonic acid in near quantitative yield (98%) based on hydrazine as the limiting reagent. The present inventors have found that this compound allows for the facile remediation of hydrazine under a variety of conditions. The present inventors have also ascertained that 2KG has an excellent potential to reduce the hazards associated with the handling and storage of hydrazine fuels. The present inventors have executed extensive work on the reaction between Hz and 2KG. Such a reaction has been found to be very effective at converting technical grade hydrazine to less than ppm levels (none detected by Draeger Tube measurement and other methods). The remediation of hydrazine occurs in less than one hour without the evolution of excessive heat.

An examination of the use of various keto-acids (e.g., such as 2-ketoglutaric acid and other dicarbonyl compounds) for the production of a hydrazine filter has been performed. Such an examination relates to the development of the hydrazine filter, which is disclosed in greater detail herein and is based on determining the optimal solid support (e.g., carbon, etc.) and keto-acid to maximize filter efficiency, along with the development of methods for the extraction of the hydrazine adduct.

The inventors have found that inexpensive solid supports offer a cost saving option for more efficient use of the keto-acid. An air filtration system passes gas over a solid reactant, for example: it is reasonable to expect that reagent near the surface reacts readily, while interior portions react slowly. The inventors have demonstrated that this is an effective approach for the remediation of hydrazine (e.g., hydrazine, 1,1-dimethylhydrazine, and/or monomethyl-hydrazine). However, such a configuration can lead to poor utilization of the reagent. Thus, attempts at coating a variety of glass, ceramic, and carbon supports of different particle size were undertaken. Aqueous and methanolic solutions of the keto-acid were deposited onto substrates by vacuum evaporation of solvents while continuously rotating the container. In most cases this process resulted in clumped aggregates rather than coated particles, even from relatively dilute solutions of keto-acid. However, sand appears to coat uniformly based on appearance and microscopic observations. Smaller particles of silica and glass helices clumped or gave poor uniformity of deposition. Larger grains or gravel provide too little surface area relative to the large mass they bring. Consequently, sand coated with different loadings of reagent was pursued further and the remediation results are described later herein. Spraying or otherwise applying a slurry of the active chemical can also be used for coating support materials.

Attempts to coat ceramic saddles by spraying the pieces with concentrated solutions of keto-acid and allowing for air drying afforded poor uniformity of coating. Solvent appeared to leach towards the most exposed sites where most of the evaporation of solvent occurred. Ceramic saddles afford high surface area relative to their mass and have higher airflow capacity. The saddles are well suited to air filtration and are being explored with a solution based counter-flow apparatus of similar design to the full scale air filtration apparatus NASA, for example, currently uses at launch sites.

FIG. 1 illustrates a scheme indicative of the reaction of hydrazine (Hz) with 2-ketoglutaric acid to yield a high melting stable organic compound. The chemical formulation depicted in scheme 10 is based on the use of 2-ketoglutaric add or other dicarbonyl compounds for the remediation of hydrazine, in accordance with an embodiment.

Figure 2:
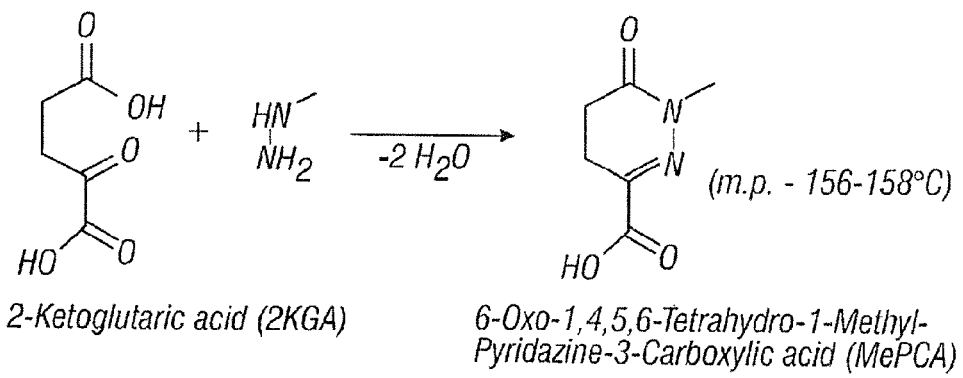
FIG. 2 illustrates a scheme outlining the reaction of onomethyl hydrazine (MMH), with 2-ketoglutaric add, in accordance with an embodiment.

FIG. 2 illustrates a scheme 20 outlining the reaction of monomethyl-hydrazine (MMH), with 2-ketoglutraric acid, in accordance with an embodiment. The product of the reaction of scheme 20 is also a high melting stable organic molecule.

A variety of pyridazine ring systems have been used extensively for a variety of medical applications. These include pharmaceuticals for heart disease, HIV, Alzheimer's disease, antidepressants, and even cognitive enhancement drugs. The MSDS (HMIS rating) hazard classification and the DOT classifications for the hydrazine reagents and the compounds described above appear in Table 1 below:

TABLE 1

MSDS - Hazards Identification (HMIS Ratings) and Transportation (DOT) Regulations

| Compound | Health (Acute Effects) | Flammability | Reactivity | Transportation Regulations |
|---|---|---|---|---|
| Hydrazine | 3 | 3 | 3 | 8 |
| Monomethyl Hydrazine | 3 | 3 | 3 | 8 |
| Dimethyl Hydrazine | 3 | 3 | 3 | 8 |
| 2-Ketoglutaric acid | 1 | 1 | 0 | None |
| 6-Oxo-1,4,5,6-tetrahydropyridazin-3-carcontainerylic acid (PCA) | 1 | 1 | 1 | None |
| Glutamine | 1 | 1 | 0 | None |
| Methyl glutamic acid | 1 | 1 | 1 | None |
| Glutamic acid | 1 | 1 | 1 | None |
| Pyroglutamic acid | 2 | 1 | 0 | None |

Shows the HMIS ratings (Scale 0-4) and DOT Dangerous Goods Ratings (8 = Corrosive)

Hydrazine group compounds hydrazine (Hz), monomethyl-hydrazine (MMH), and 1,1-dimethylhydrazine (UDMH) are widely used as fuels (in rocket propulsion systems and fighter jets), corrosion inhibitors (e.g. electric power generating industries), catalysts, emulsifiers, or dyes. It is also a common precursor in the synthesis of a number of polymers, plasticizers, and pesticides. Recently, a variety of medicinal drugs have incorporated the hydrazine molecule. The inventors are currently examining compounds that will react with hydrazine rapidly and quantitatively.

Figure 3:
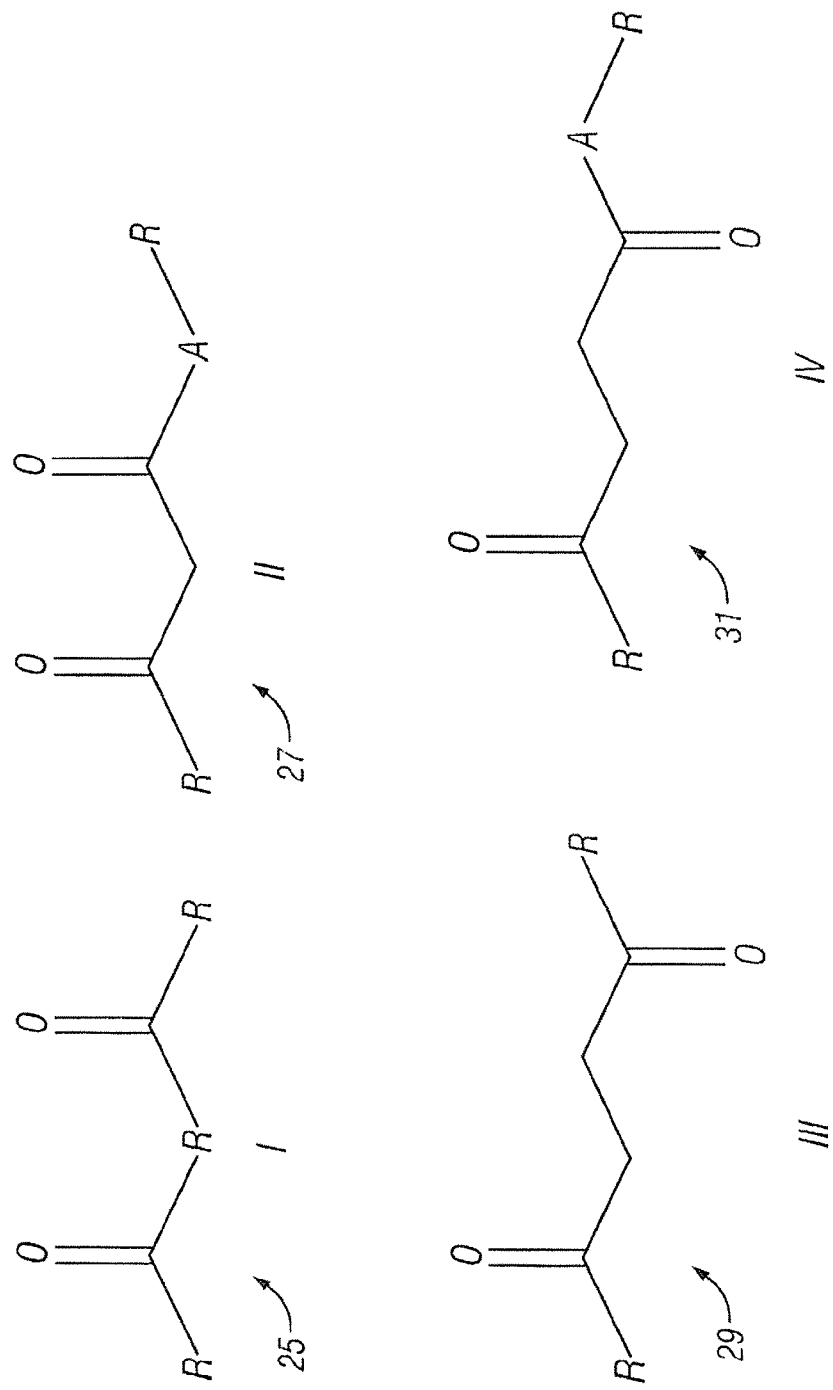
FIG. 3 illustrates general structural formulas for dicarbonyl compounds, which can be utilized in accordance with varying embodiments.

FIG. 3 illustrates general structural formulas for dicarbonyl compounds as shown by chemical schemes 25, 27, 29, and 31, respectively, I, II, III and IV. I and II are examples of beta-dicarbonyl compounds, while III and IV are gamma-dicarbonyl compounds. More remote dicarbonyl compounds in which the two carbonyl compounds are more remote from one another may also be used. Examples of these compounds are acetoacetone, propanedial, ethyl acetoacetate, levulinic acid, ethyl levulinate, and 1,3-diphenylpropane-1,3-dione. Other carbonyl-like functional groups can also undergo a comparable reaction with hydrazine and are included as a part of the definition of dicarbonyl compounds utilized herein. Acetoacetonitrile is an example of such a compound.

Figure 4:
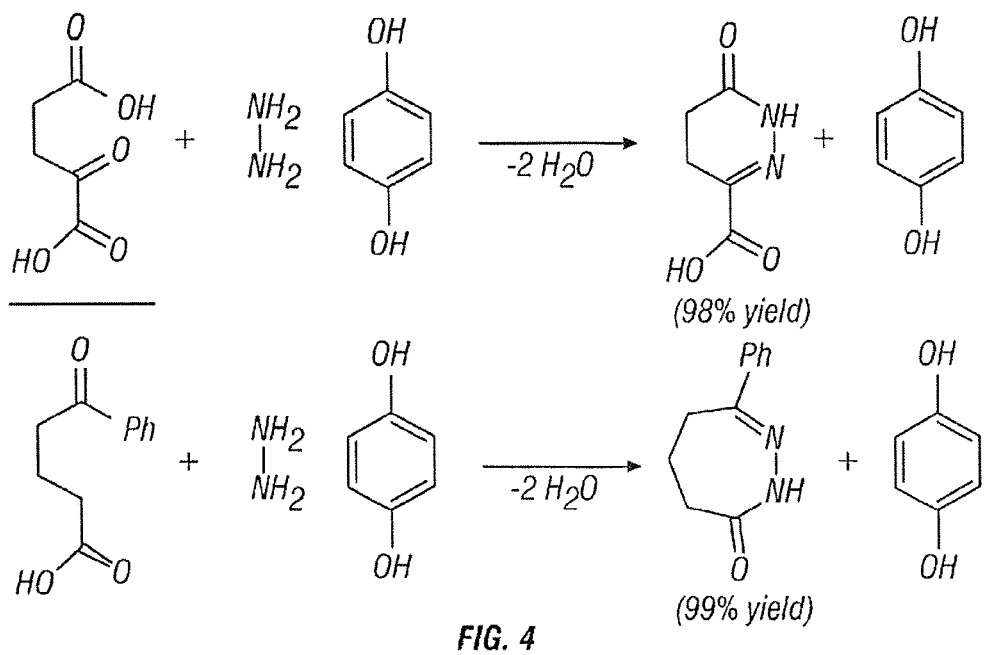
FIG. 4 illustrates examples of the reaction between a ketoacid and a complex of hydrazine, in accordance with an embodiment.

Two classes of compounds that were examined are keto-acids and keto-esters. FIG. 4 illustrates a schematic diagram depicting examples of the reaction between a keto-acid and a complex of hydrazine. In each case the solid compounds were ball milled at room temperature in a ratio of 2:1 (keto-acid to hydrazine complex) and a near quantitative yield was obtained. The 6-oxo-1,4,5,6-tetrahydro-pyridazine-3-carboxylic acid (CAS #27372-38-9) formed from the reaction of 2 KG and the hydrazine complex is a high melting solid (m.p. 196° C.-198° C.). The MSDS for this compound does not show any transportation hazards and is not listed on the TSCA list of hazardous or regulated compounds. Therefore, the waste stream from this process (if one chooses to dispose of it at this time) would no longer be a hazard. When hydrazine is treated with an aqueous solution of 2 KG, the 6-oxo-1,4,5,6-tetrahydro-pyridazine-3-carboxylic acid (PCA) is immediately formed. PCA precipitates and can be recovered as a pure compound.

Figure 5:
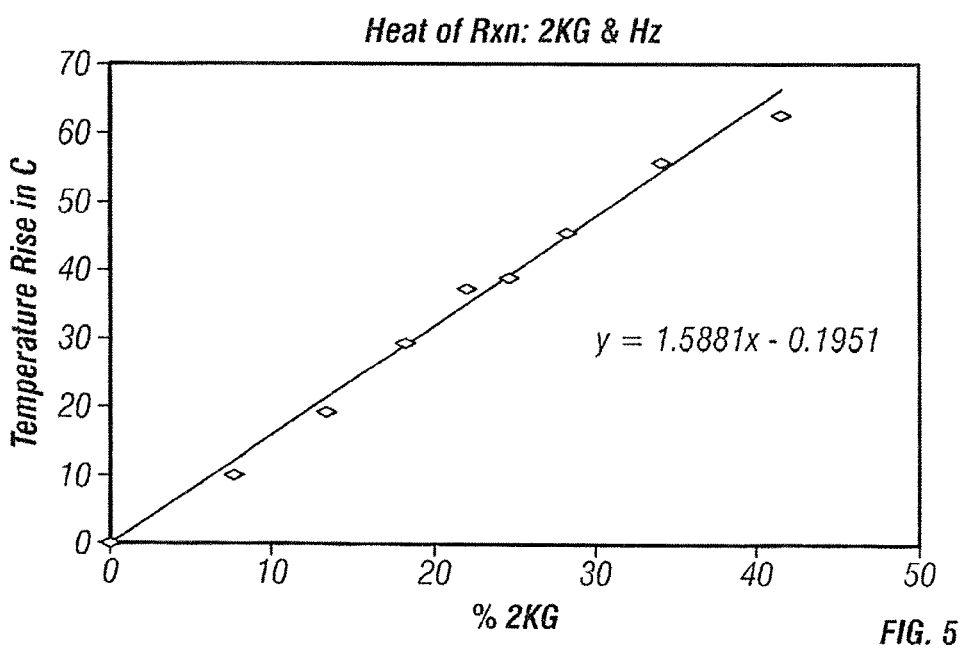
FIG. 5 illustrates a graph depicting the temperature increase from the reaction between hydrazine and solutions varying concentrations of 2KG, in accordance with an embodiment.

The amount of heat that is produced from this reaction is dependent on the concentration of 2 KG. FIG. 5 illustrates a graph depicting the temperature increase from the reaction between hydrazine and solutions varying concentrations of 2 KG. The data in the graph of FIG. 5 demonstrates the relationship between concentration and heat produced by the reaction. For example, 15 grams of 2 KG were dissolved with 75 mL of water, then 7 mL (1.1 equivalents) of hydrazine monohydrate were added for the point at 20%. The MMH reaction with 2 KG also produces a 3-pyridazinecarboxylic acid, 1,4,5,6-tetrahydro-1-methyl-6-oxo-cyclic structure. It has a melting point of 156-158° C.

Figure 6:
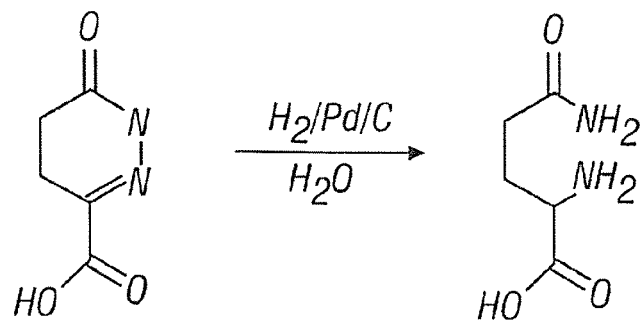
FIG. 6 illustrates a scheme in which the cyclic compounds can be treated with hydrogen gas over a palladium catalyst in water to produce D,L-glutamine.
Figure 7:
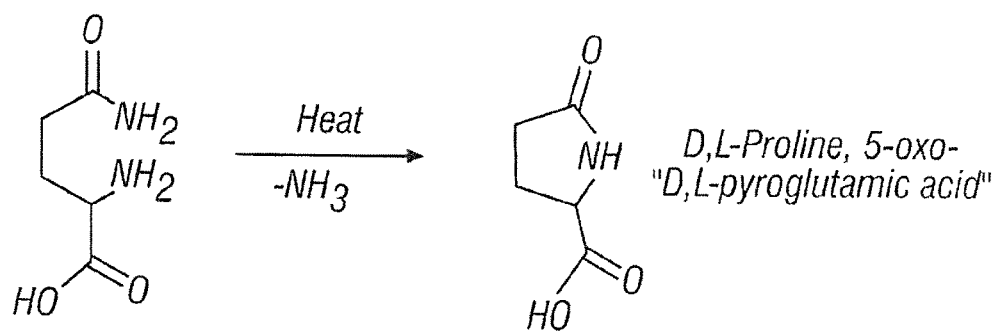
FIG. 7 illustrates a scheme in which the compound can be treated with heat to produce the sample compound D,L-proline, 5-oxo-, in accordance with an embodiment.
Figure 8:
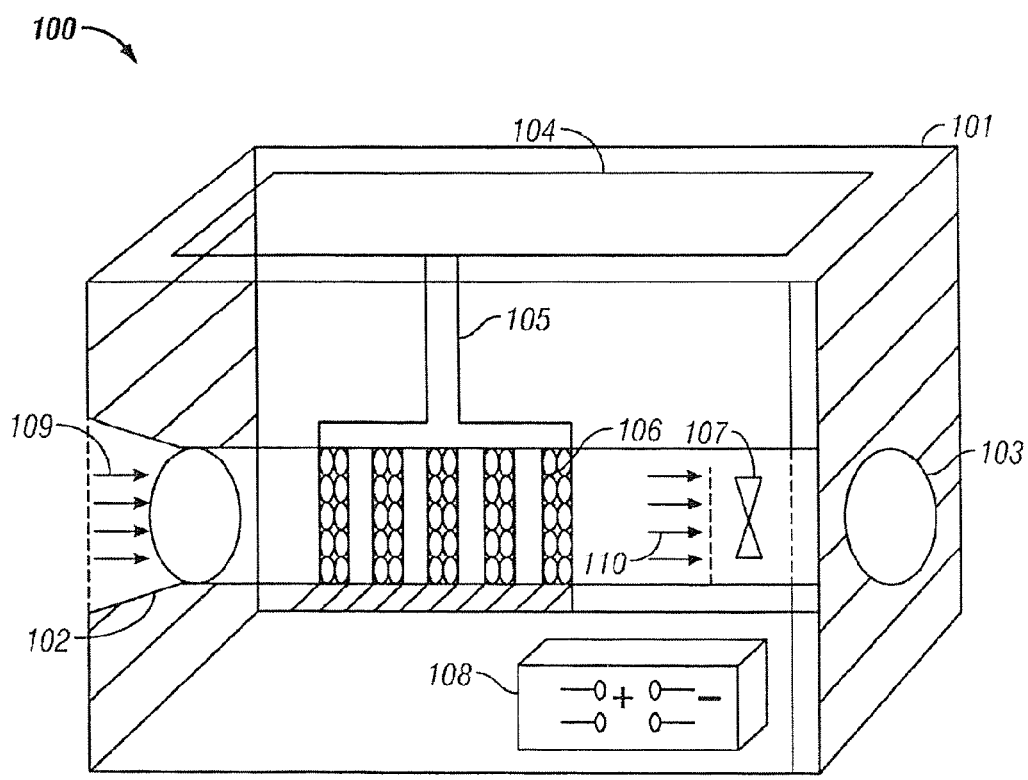
FIG. 8 illustrates a pictorial diagram of a system for remediating hydrazine from a hydrazine-contaminated gas, in accordance with an embodiment.

An extraction method was not necessary because the 3-pyridazinecarboxylic acid, 1,4,5,6-tetrahydro-1-methyl-6-oxo- was a solid, which precipitated from the reaction. The cyclic compounds can be treated with hydrogen gas over a palladium catalyst in water to produce D,L-glutamine as illustrated in the scheme 60 depicted in FIG. 6. The compound can then be treated with base and heated to produce the sample compound D,L-proline, 5-oxo- as shown in scheme 70 depicted in FIG. 7. Additional work has yielded a filtration system that allows for the safe and efficient removal of hydrazine from contaminated gases. FIG. 8 illustrates an example of such a filtration system.

FIG. 8 therefore illustrates a schematic diagram of a system 100 implemented in the context of a container 101 for the remediation of hydrazine from a hydrazine-contaminated gas, in accordance with an embodiment. Preferably, the container 101 is rectangular in shape and is made of heat resistant materials like metal, aluminum, carbon, or plastic. Although the external appearance of the container 101 is preferably rectangular in shape it can be appreciated that the container 101 can be implemented as a square, rectangular, circular, round, oval, or other shape (e.g., custom shaped), depending upon design considerations. Thus, the use of a rectangular shape is not considered a limiting feature of the embodiments, but is described herein for general illustrative purposes only. The container 101 may or may not be divided into different chambers. System 100 includes inlet port 102 and an outlet port 103, which respectively permits contaminated gas to enter into and go out of the container 101.

The container 101 includes a removable lid 104 thereon to which a water dripping mechanism 105 may be attached. The water dripping mechanism 105 can be utilized, for example, to spray or drip water onto the absorbent material 106 arranged within the container 101. Note that in one embodiment, the absorbent material 106 may be provided as a wipe or wipes. In another embodiment, such absorbent material 106 may be implemented as one or more absorbing pads, filters, wipes, or other such appropriate media. A fan or vacuum pump 107 can be attached near the side of the outlet port 103 and can be used to draw contaminated gas into the container 101.

In the form of a pad or filter, for example, the absorbent material 106 may be formed from appropriate materials within containment net. Examples of such materials include excelsior (wood wool), aspen wood fiber, etc. Other potential materials include plastics and melamine paper. The thickness of the padding media may play a part in the decontamination efficiency, allowing for longer contact as gas flows through the pad. For example, an eight-inch-thick pad with its increased surface area may be more efficient than a one-inch pad. Depending on design objects, such as Hz concentration reduction targets, back pressure, absorbent materials can be optimized. As used herein, absorbent materials refer to an inert support matrix as opposed to a reagent that in some sense absorbs Hz into its chemical structure to neutralize it.

The absorbent material 106 may be saturated with a solution (e.g., aqueous) of a dicarbonyl compound such as, for example, ketoglutaric acid. Also the absorbent material 106 may be coated with supporting granules of, or suspending a dry powder of dry dicarbonyl compound such as, for example, ketoglutaric acid. In some embodiments, the dicarbonyl compound preferably may constitute a dry powder after treatment of the absorbent material. A power supply 108 may also be incorporated within and/or integrated with or separate from the container 101. As indicated in the configuration depicted in FIG. 8, hydrazine-contaminated gas 109 may enter the container 101 through the inlet 102 and purified, decontaminated gas 110 that does not contain hydrazine leaves the container through the outlet 103. The absorbent material 106 is removable and can be replaced when stable organic compounds formed by the reaction between hydrazine and the dicarbonyl compound accumulated thereon.

Figure 9:
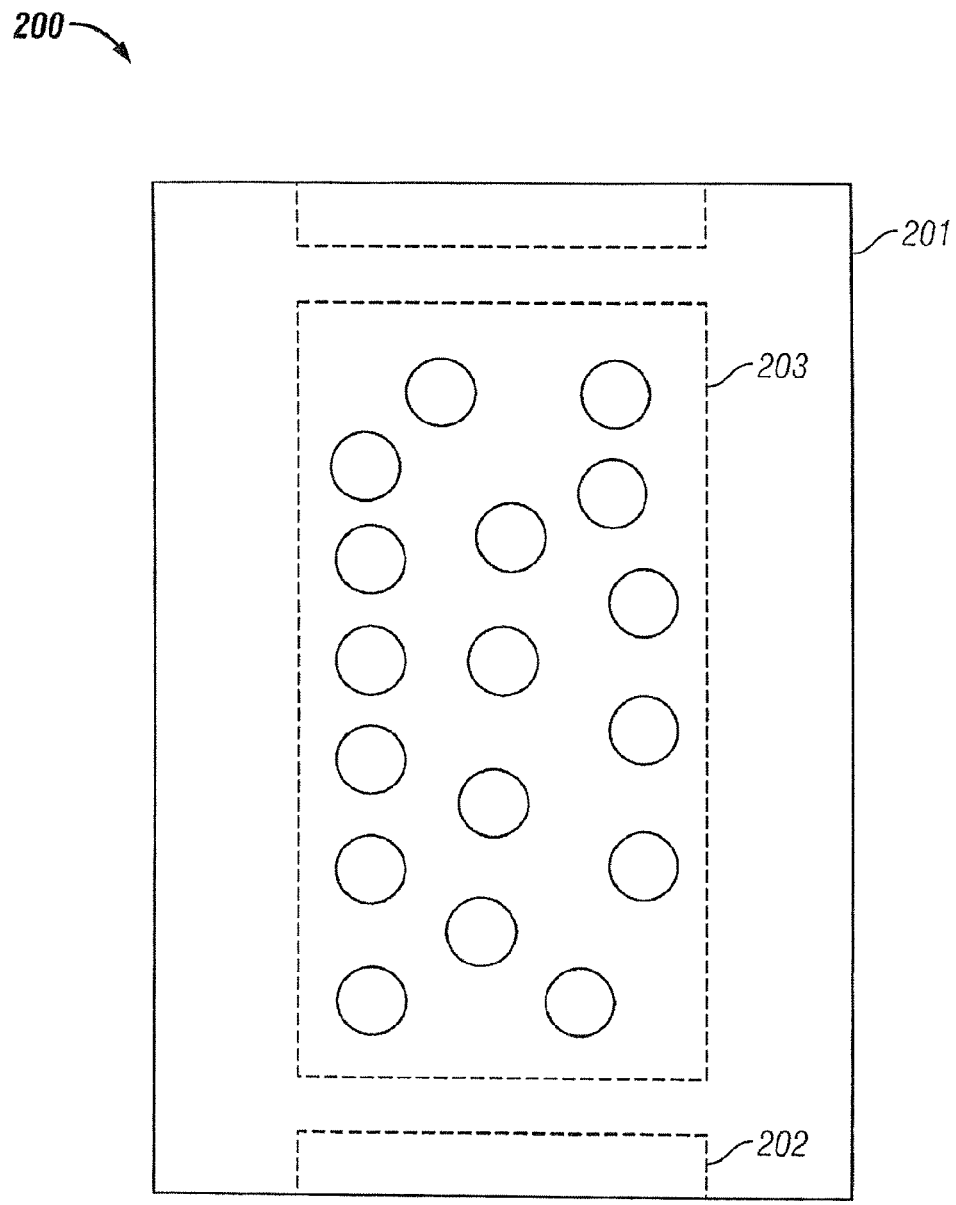
FIG. 9 illustrates a diagrammatic representation of the cross section of an apparatus comprising an absorbing material (e.g., pads, wipes or filters) for the remediation of hydrazine from a hydrazine-contaminated gas, in accordance with an embodiment.

FIG. 9 depicts a cross-sectional of the absorbent material 106 depicted in FIG. 8, in accordance with an embodiment. The absorbent material 106 (e.g., a pad or wipe) generally includes a porous surface cover 201 which may surround a shape, including an inert absorbent interior component coated with absorbed dicarbonyl compound such as ketoglutaric acid that reacts with hydrazine present in gas or any liquid spill, such that the spill is neutralized within the absorbent material 106.

In accordance with one embodiment, the absorbent material 106 can include a porous outer fabric surface covering that allows passage of a hydrazine containing phase (neat hydrazine, a solution with hydrazine or gas containing hydrazine) from a chemical release on a substrate or present in solution into the absorbing pad. The surface covering material may be desirably a chemically resistant cloth or cloth-like material which will shape and maintain the integrity of the pad while containing the inner components and absorbed liquid during use.

An absorbent component 202 can be disposed inside the outer fabric bag with an absorbent interior or core 203. The absorbent interior or core 203 of the pad is generally disposed or embedded within the absorbent component 202 and can include dicarbonyl compounds (e.g., aqueous solution or dry chemical) such as, for example, ketoglutaric acid for reacting with hydrazine in the gas phase, in aqueous solution or in a liquid spill.

In use, the spilled hydrazine can be diluted with water before the pad or wipe is applied to clean up the spill. The water in the aqueous solution, for example, assists in the chemical reaction by allowing the hydrazine to migrate to the absorbent interior or core 203 where the aqueous hydrazine is converted into a stable organic compound by reacting with the dicarbonyl compound in the pad. Water also assists in moderating the heat formed during the reaction. The amount of water to be added is not strictly defined and can be varied by those skilled in the art.

It can be appreciated that system 100 is also capable of remediating hydrazine without the absorbent material 106 as described above. For example, a "dry" implementation of system 100 can be configured, in accordance with an alternative embodiment, in which a spray is employed in place of the absorbent material 106, wherein such a spray may contain an aqueous or dry powder composed of, for example, ketoglutaric acid. See, for example, FIG. 11, which illustrates such an alternative embodiment.

Figure 10:
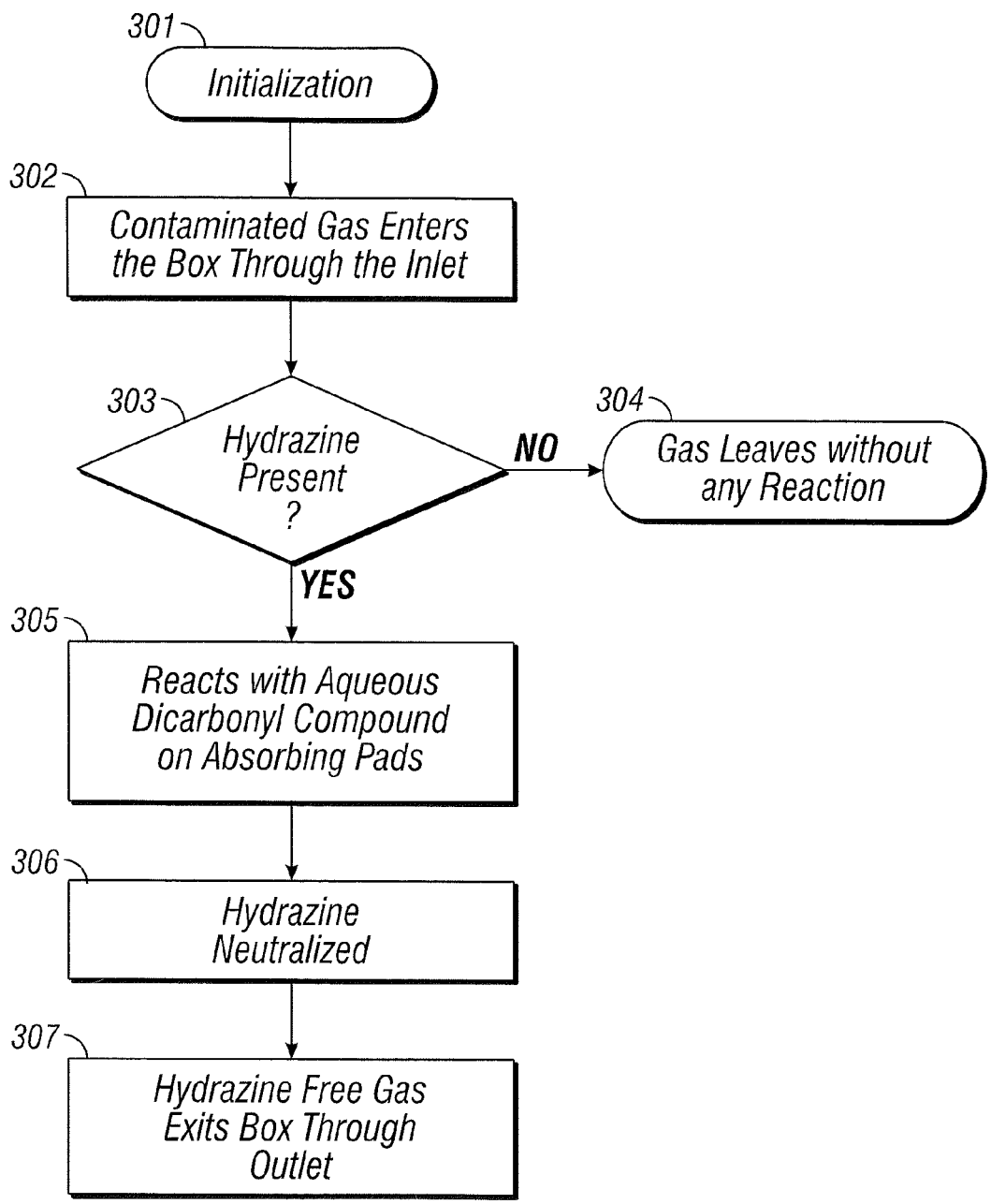
FIG. 10 illustrates a flow chart of operations depicting the operation of the system depicted in FIG. 8 for the remediation of hydrazine from a hydrazine-contaminated gas, in accordance with an embodiment.

FIG. 10 illustrates a flow chart of operations depicting the operation of the system depicted in FIG. 8 for the remediation of hydrazine from a hydrazine-contaminated gas, in accordance with the disclosed embodiments. When the process is initialized as illustrated at block 301, hydrazine contaminated gas 109 enters through the inlet port 102 as indicated at block 302. If no hydrazine is present in the hydrazine contaminated gas 109, it passes out of the container 101 without any reaction, as depicted at block 304. It however, hydrazine is present as indicated at block 303, it reacts with the solution (e.g., aqueous or dry) of dicarbonyl compound located on the absorbent material 106 as depicted at block 305. As a result, hydrazine is neutralized, as indicated at block 306, the hydrazine contaminated gas 109 becomes free of hydrazine as depicted at block 307, and exits the container or box 101 through the outlet port 103. Thus, decontaminated gas 110 exits via the outlet port 103 as described at block 307.

Figure 11:
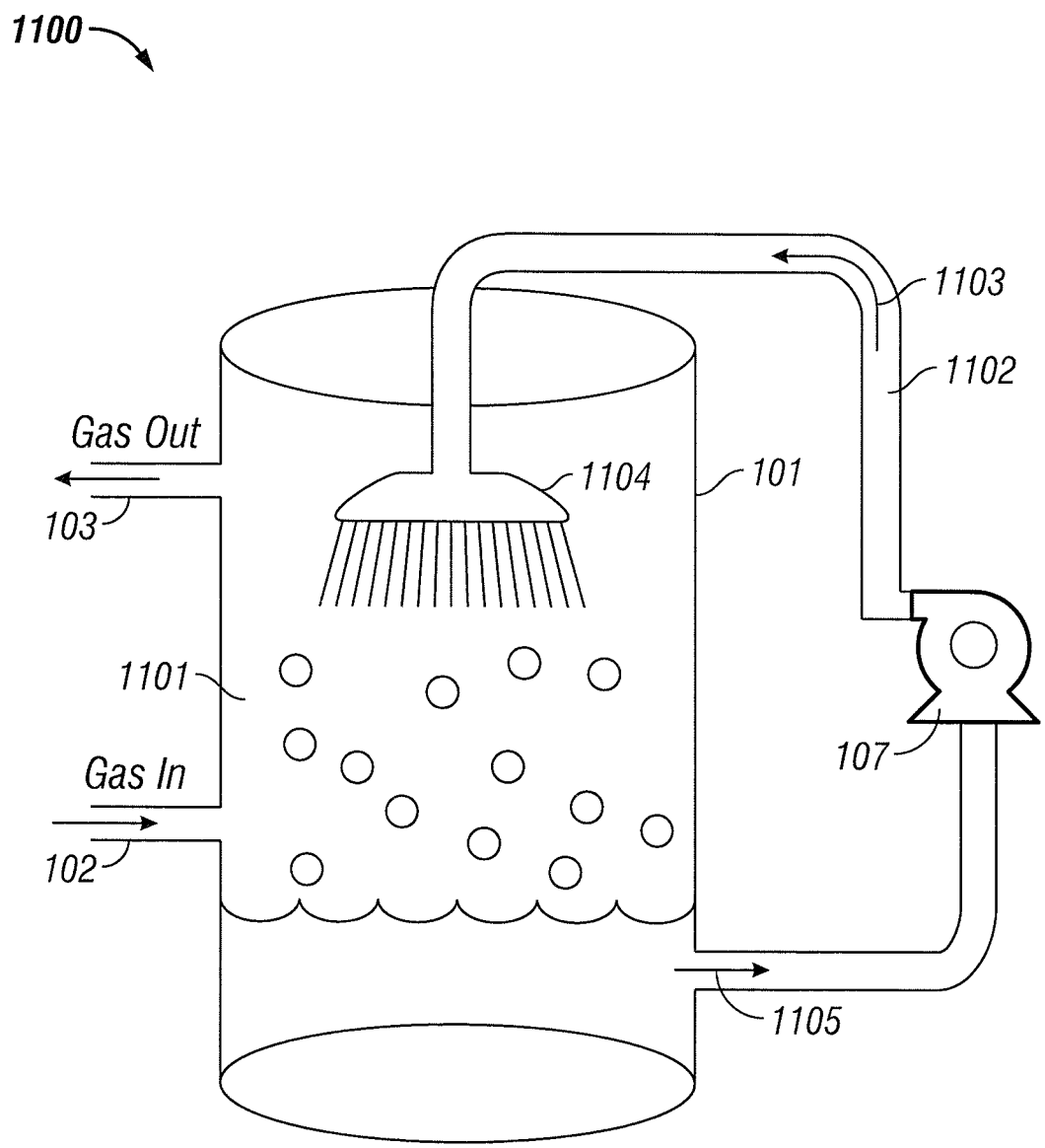
FIG. 11 illustrates a pictorial diagram of a system for remediating hydrazine from a hydrazine-contaminated gas, wherein the system includes a cylindrical container, in accordance with an embodiment.

FIG. 11 illustrates a pictorial diagram of a system 1100 for remediating hydrazine from hydrazine-contaminated gas 109, wherein the system 1100 includes a cylindrical container 101, in accordance with an embodiment. Note that the system 1100 depicted in FIG. 11 illustrates an alternative version of the embodiment of system 100 depicted in FIG. 8. The container 101 illustrated in FIG. 8 is generally square or rectangular in shape, whereas the container 101 as depicted in FIG. 11 is cylindrical shape. The container 101 depicted in FIG. 11 functions as a reactor and generally includes an inlet port 102 and an output port 103. Hydrazine-contaminated gas enters the container 101 through the Inlet port 102. Decontaminated gas exits via the outlet port 103. Liquid travels as indicated by arrow 1103 through a channel 1102 from the bottom of the container 101 and can exit through a spray nozzle 1104 connected to the channel 1102. A pump 107 generally assists in moving fluid from the container 101 through the channel 1102 (e.g., a hose or tubing) and toward the top of the container 101 where it exits through the spray nozzle 1104.

System 1100 thus can function as a gas scrubbing system. Hydrazine contaminated gas flows into the container 101 through the inlet port 102 upward through the container 101 and out the outlet port 103. A solution of dicarbonyl compound is thus re-circulated through the container 101. The solution is sprayed from the spray nozzle 1104 over a stationary solid support material 1101, over which it drains down to the bottom of the reactor or container 101 and is sucked out by pump 107 through an orifice 1105. The stationary solid support material 1101 may be, for example, plastic, metal, glass, ceramic, or other solids, and may possess various shapes either of regular structures such as saddles or irregular shapes such as broken glass.

The disclosed system and methodology offer a number of advantages and is particularly useful to those industries where hydrazine is utilized and potentially leads to contamination. The electrical generating industry, for example, is one area where hydrazine contamination presents a significant possibility. As such, the approach disclosed herein would be particularly useful in this environment.

In the aerospace industry, for example, a particular turbine engine may provide emergency hydraulic and electric power. When the hydrazine and water mixture is released and passes across an iridium catalyst, for example, it spontaneously ignites, creating hot expanding gases, which drive the turbine. The power created is transmitted through a gearbox to drive an electrical generator and hydraulic pump. The hydrazine is contained in a sealed, nitrogen charged accumulator. When the system is armed, the hydrazine is released whenever the engine-driven generators go off-line, or if all engine-driven hydraulic pumps fail. Such hydrazine, when released, will pose a hazard to human health. Hydrazine may also be released when the system is serviced.

Electrical fuel cell applications are another example where hydrazine contamination may come into effect. For example, some fuel cell technology may eliminate the need for platinum, a precious metal that has been an essential material in the electrode catalyst in conventional fuel cells for automobiles. However, such technology also fixes hydrazine hydrate inside the fuel tank to ensure its safe use as a fuel, resulting in no tailpipe $CO_2$ emissions. Thus, if hydrazine fuel cell technology, in particular, is widely adopted in the future, the potential for hydrazine leakage is possible.

Renowned as a rocket propellant, hydrazine can be used to efficiently regenerate spent ammonia borane as a hydrogen storage material and advance development of hydrogen fuel cells for powering vehicles, for example, as implemented in the embodiments disclosed in FIGS. 8 to 11. Previous attempts at regenerating ammonia borane used prohibitively-expensive ortho-benzenedithiol and tin hydride. Ammonia borane is a better potential hydrogen storage material as ammonia borane is stable at ambient temperatures and does not require either external cooling to retain hydrogen or high temperatures to evolve hydrogen. Ammonia borane is a solid that melts around 100° C., and reacts with water in a gas scrubbing-type system, such as the system disclosed in FIGS. 8 to 11.

Ammonia borane can contain about twenty percent hydrogen by weight and can release over two equivalents of molecular hydrogen per molecule. When ammonia borane releases hydrogen, it becomes polyborazylene. For ammonia borane to controllably deliver hydrogen and be used commercially, it can be regenerated from polyborazylene using hydrazine and ammonia. Hydrazine in liquid ammonia can almost quantitatively regenerate ammonia borane at a centralized and industrial scale, or aboard individual vehicles or devices. An application of this system would be removal of hydrazine from ammonia borane by recirculation of gas through a bed of ammonia borane in the gas purifying system of FIGS. 8 to 11, for example. The system could also be implemented using two chambers, one containing the regenerated ammonia borane, and a subsequent chamber in the gas flow path containing the dicarbonyl compound. The gas could be re-circulated to regenerate ammonia borane. Ammonia borane regeneration may or may not occur in the same chamber as remediation. The hydrazine may or may not be removed from the ammonia borane in the same chamber in which the polyborazylene is regenerated. In other words, the polyborazylene could be regenerated in one chamber then transferred to another chamber in the container for decontamination.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A system for the remediation of gas contaminated with hydrazine, said system comprising:
    a container with an inlet through which gas contaminated with hydrazine enters said container, wherein said container contains regenerated ammonia borane, wherein said ammonia borane releases hydrogen forming polyborazylene, wherein said ammonia borane regenerates as said contaminated as circulates through said container as a hydrogen storage material when said polyborazylene reacts with said hydrazine and ammonia, wherein said contaminated gas flows in a gas flow path through said container, wherein said container contains a dicarbonyl compound, wherein said dicarbonyl compound removes hydrazine from said contaminated gas flow;
    an outlet through which decontaminated gas passes out of said container; and
    at least one absorbent material located within said container, said at least one absorbent material comprising an absorbent medium having said dicarbonyl compound, wherein said gas contaminated with hydrazine reacts with said dicarbonyl compound to neutralize and convert said gas contaminated with hydrazine into decontaminated gas comprising a stable organic compound that exits said container through said outlet.

2. The system of claim 1 wherein said dicarbonyl compound comprises at least one of the following: ketoglutaric acid, a beta-dicarbonyl compound, a gamma-dicarbonyl compound, a remote dicarbonyl compound, a compound selected from a carbonyl-like functional group, a compound selected from a carbonyl-like functional group comprises acetoacetonitrile, a dry powder, and a spray.

3. The system of claim 2 wherein said remote dicarbonyl compound comprises at least one of the following compounds: acetoacetone, propanedial, ethyl acetoacetate, levulinic acid, ethyl levulinate, and 1,3-diphenylpropane-1,3-dione.

4. The system of claim 1 wherein said at least one absorbent material permits said gas contaminated with hydrazine to pass through said at least one absorbent material.

5. The system of claim 1 wherein said container comprises container walls comprising at least one material selected from the following groups of materials: a natural material, metal, glass, a synthetic material, and a heat resistant material.

6. The system of claim 1 wherein said at least one absorbent material comprises at least one absorbent material selected from the following group of materials: a pad, a fibrous material, and a granular material.

7. The system of claim 1 further comprising:
    a drip mechanism connected to said container, said drip mechanism configured to deliver liquid to said at least one absorbent material within said container to control heat produced during a chemical reaction within said container; and
    a removable lid coupled to said container and said drip mechanism.

8. The system of claim 1 further comprising:
    a fan located approximate to said inlet of said container, wherein said fan draws said gas contaminated with hydrazine into said container through said inlet; and
    a fan located approximate to said outlet said fan draws said decontaminated gas out of said container through said outlet.

9. The system of claim 1 further comprising:
    a suction mechanism located approximate to said inlet of said container, wherein said suction mechanism draws said gas contaminated with hydrazine into said container through said inlet; and
    a suction mechanism located approximate to said outlet of said container, wherein said suction mechanism draws said decontaminated gas out of said container through said outlet.

10. A system for the remediation of gas contaminated with hydrazine, said system comprising:
    a container with an inlet through which gas contaminated with hydrazine enters said container, wherein said container contains regenerated ammonia borane wherein said ammonia borane releases hydrogen forming polyborazylene wherein said ammonia borane regenerates as said contaminated gas circulates through said container as a hydrogen storage material when said polyborazylene reacts with said hydrazine and ammonia, wherein said contaminated gas flows in a gas flow path through said container, wherein said container contains a dicarbonyl compound, wherein said dicarbonyl compound removes hydrazine from said contaminated gas flow;
    an outlet through which decontaminated gas passes out of said container;
    at least one absorbent material located within said container, said at least one absorbent material comprising an aqueous absorbent medium to which said dicarbonyl compound is previously applied, said dicarbonyl compound comprising a dry powder composed of ketoglutaric acid;
    a first suction mechanism located approximate to said outlet of said container, wherein said suction mechanism draws said decontaminated gas out of said container through said outlet; and
    a second suction mechanism located approximate to said inlet of said container, wherein said suction mechanism draws said gas contaminated with hydrazine into said container through said inlet, wherein said gas contaminated with hydrazine reacts with said dicarbonyl compound to neutralize and convert said gas contaminated with hydrazine into decontaminated gas comprising a stable organic compound that exits said container through said outlet and wherein said at least one absorbent material permits said gas contaminated with hydrazine to pass through said at least one absorbent material.

11. The system of claim 10 wherein said at least one absorbent material comprises at least one absorbent material selected from the following group of materials: a pad, a fibrous material, and a granular material.

12. The system of claim 10 further comprising:
a drip mechanism connected to said container, said drip mechanism configured to deliver liquid to said at least one absorbent material within said container to control heat produced during a chemical reaction within said container; and
a removable lid coupled to said container and said drip mechanism.

13. A system for the remediation of hydrazine from ammonia borane to efficiently regenerate spent said ammonia borane as a hydrogen storage material, said system comprising:
a container with an inlet through which gas contaminated with hydrazine enters a first chamber of said container, wherein said first chamber contains regenerated ammonia borane, wherein said ammonia borane releases hydrogen forming polyborazylene, wherein said ammonia borane regenerates as said contaminated gas circulates through said container as said hydrogen storage material when said polyborazylene reacts with said hydrazine and ammonia, wherein said contaminated gas flows in a gas flow path through a second chamber of said container, wherein said second chamber contains a dicarbonyl compound, wherein said dicarbonyl compound removes hydrazine from said contaminated gas flow;
an outlet through which decontaminated gas passes out of said container;
a first suction mechanism located approximate to said outlet of said container, wherein said suction mechanism draws said decontaminated gas out of said container through said outlet; and
a second suction mechanism located approximate to said inlet of said container, wherein said suction mechanism draws said gas contaminated with hydrazine into said container through said inlet, wherein said gas contaminated with hydrazine reacts with said dicarbonyl compound to neutralize and convert said gas contaminated with hydrazine into decontaminated gas comprising a stable organic compound that exits said container through said outlet and wherein said at least one absorbent material permits said gas contaminated with hydrazine to pass through said at least one absorbent material.

14. The system of claim 13 wherein said dicarbonyl compound comprises at least one of the following: ketoglutaric acid, a beta-dicarbonyl compound, a gamma-dicarbonyl compound, a remote dicarbonyl compound, a compound selected from a carbonyl-like functional group, a compound selected from a carbonyl-like functional group comprises acetoacetonitrile, a dry powder, a granular absorbent or support material coated with a dry dicarbonyl compound, suspended dry dicarbonyl compounds, a liquid solution supported by an absorbent material, a neat liquid, a spray of said neat liquid, a solution of said neat liquid passing over a ceramic saddle material.

15. The system of claim 14 wherein said remote dicarbonyl compound comprises at least one of the following compounds: acetoacetone, propanedial, ethyl acetoacetate, levulinic acid, ethyl levulinate, and 1,3-diphenylpropane-1,3-dione.

16. The system of claim 13 wherein said at least one absorbent material comprises at least one absorbent material selected from the following group of materials: a pad, a fibrous material, and a granular material.

17. The system of claim 13 further comprising:
a drip mechanism connected to said container, said drip mechanism configured to deliver liquid to said at least one absorbent material within said container to control heat produced during a chemical reaction within said container; and
a removable lid coupled to said container and said drip mechanism.

18. The system of claim 13 wherein said at least one absorbent material permits said gas contaminated with hydrazine to pass through said at least one absorbent material.

19. The system of claim 13 wherein said container comprises container walls comprising at least one material selected from the following groups of materials: a natural material, metal, glass, a synthetic material, and a heat resistant material.

* * * * *